United States Patent
Lee et al.

(10) Patent No.: US 11,187,787 B2
(45) Date of Patent: Nov. 30, 2021

(54) OBSTACLE DETECTION METHOD FOR A VIRTUAL RADAR SENSOR FOR VEHICLE ADAS TESTING

(71) Applicant: INDUSTRY-UNIVERSITY COOPERATION FOUNDATION HANYANG UNIVERSITY, Seoul (KR)

(72) Inventors: Hyeong Cheol Lee, Seoul (KR); Kyung Sup Yoon, Seoul (KR); Chang Woo Park, Seoul (KR)

(73) Assignee: INDUSTRY-UNIVERSITY COOPERATION FOUNDATION HANYANG UNIVERSITY, Seoul (KR)

( * ) Notice: Subject to any disclaimer, the term of this patent is extended or adjusted under 35 U.S.C. 154(b) by 338 days.

(21) Appl. No.: 16/276,122

(22) Filed: Feb. 14, 2019

(65) Prior Publication Data

US 2019/0265331 A1    Aug. 29, 2019

(30) Foreign Application Priority Data

Feb. 27, 2018 (KR) .................. 10-2018-0023365

(51) Int. Cl.
*G01S 7/40* (2006.01)
*G09B 9/54* (2006.01)

(52) U.S. Cl.
CPC ............. *G01S 7/4052* (2013.01); *G09B 9/54* (2013.01)

(58) Field of Classification Search
CPC .................. G01S 7/4052; G09B 9/54
See application file for complete search history.

(56) References Cited

U.S. PATENT DOCUMENTS

| 2017/0010346 A1* | 1/2017 | Rolfsmeier | ........... G01S 7/4026 |
| 2017/0010347 A1* | 1/2017 | Schutte | ................ G01S 7/4052 |
| 2017/0307732 A1* | 10/2017 | Haghighi | .............. G01S 7/4056 |

(Continued)

FOREIGN PATENT DOCUMENTS

| KR | 10-1357597 B1 | 2/2014 |
| KR | 10-2017-0069246 A | 6/2017 |

OTHER PUBLICATIONS

Wonbin Na et al., "Development of VIL-testing Visualization Module using Unreal Engine4", Transactions of Korea Society of Automotive Engineers vol. 2017.

(Continued)

*Primary Examiner* — Donald HB Braswell

(57) ABSTRACT

A method of detecting obstacle vehicles present in a virtual driving environment by using a virtual radar sensor for an ADAS test of a vehicle is disclosed. The disclosed obstacle detection method may include: establishing an obstacle vehicle candidate group from at least one obstacle vehicles each represented by four points in a virtual driving environment, where the obstacle vehicle candidate group includes obstacle vehicles that are wholly or partially included in a sensing range of the virtual radar sensor; updating the obstacle vehicle candidate group by excluding an obstacle vehicle that is located in a shadow region from the obstacle vehicle candidate group; and calculating the shortest distance between an obstacle vehicle included in the updated obstacle vehicle candidate group and the virtual radar sensor.

8 Claims, 5 Drawing Sheets

(56) References Cited

U.S. PATENT DOCUMENTS

2019/0065637 A1* 2/2019 Bogdoll ............... G06N 20/00
2020/0300968 A1* 9/2020 Gruber ............... G01S 13/931

OTHER PUBLICATIONS

Bernsteiner, Stefan et al. Radar sensor model for the virtual development process. ATZelektronik worldwide. 2015., pp. 46-52.
Ferguson, Dave et al. Detection, prediction, and avoidance of dynamic obstacles in urban environments. IEEE Intelligent Vehicles Symposium. 2008.
KyungSup Yoon, ChangWoo Park, HyeongCheol Lee, "Development of radar sensor emulation module for VIL-testing of ADAS", KSAE Annual Autumn Conference & Exhibition vol. 2017 No. 11.

* cited by examiner

OBSTACLE DETECTION METHOD FOR A VIRTUAL RADAR SENSOR FOR VEHICLE ADAS TESTING

CROSS-REFERENCE TO RELATED APPLICATIONS

This application claims the benefit of Korean Patent Application No. 10-2018-0023365, filed with the Korean Intellectual Property Office on Feb. 27, 2018, the disclosure of which is incorporated herein by reference in its entirety.

BACKGROUND

1. Technical Field

The present disclosure relates to an obstacle detection method for a virtual radar sensor for testing the ADAS of a vehicle. More particularly, the present disclosure relates to a method of detecting obstacle vehicles present in a virtual driving environment by using a virtual radar sensor for an ADAS test of a vehicle.

2. Description of the Related Art

To improve the safety and convenience of the driver, current development efforts in the automobile industry are focusing on the ADAS (advanced driver assistance system). It has become a global trend to regard the installing of ADAS technology on automobiles not as an option but as a mandatory requirement, and as such, many verification methods are being proposed for testing and evaluating ADAS techniques.

One such method known as the HIL (hardware-in-the-loop) method can reduce time and cost, but since a simulation model of the vehicle is used, it may be difficult to incorporate the dynamic properties of the vehicle or environmental factors. The DHIL (driver hardware-in-the-loop) method or the VeHIL (vehicle hardware-in-the-loop) method can partially reflect the dynamic properties of the vehicle by way of a chassis dynamometer but may require high development costs and may be unable to accurately implement the actual driving environment and vehicle behavior, so that it may not be suitable for ADAS performance verification.

To resolve the above shortcomings, the VIL (vehicle-in-the-loop) method is being developed, which is an evaluation method for verifying ADAS performance based on a virtual driving environment. For a real vehicle test evaluation of an ADAS, this method provides the driver with a virtual driving environment and provides the vehicle with virtual driving environment information by which to control an actual vehicle on the road, whereby an evaluation can be performed incorporating the dynamic properties of an actual vehicle.

In particular, as virtual sensors and objects are used for the verification, it is possible to conduct an ADAS test more safely and economically compared to existing methods. However, when an ADAS is tested in a virtual driving environment, a virtual sensor is used, and there is no obstacle detection using an actual sensor, so that it is necessary to test the ADAS via a detection of virtual obstacle vehicles using the virtual sensor.

SUMMARY OF THE INVENTION

An aspect of the disclosure is to provide a method of detecting obstacle vehicles present in a virtual driving environment by using a virtual radar sensor for an ADAS test of a vehicle.

In particular, an aspect of the disclosure provides a method of detecting a virtual obstacle vehicle in a virtual driving environment in a manner similar to a real radar sensor environment.

An obstacle detection method for a virtual radar sensor for an ADAS test of a vehicle according to an embodiment of the disclosure, devised to achieve the objectives above, may include: establishing an obstacle vehicle candidate group from at least one obstacle vehicles each represented by four points in a virtual driving environment, where the obstacle vehicle candidate group includes obstacle vehicles that are wholly or partially included in a sensing range of the virtual radar sensor; updating the obstacle vehicle candidate group by excluding an obstacle vehicle that is located in a shadow region from the obstacle vehicle candidate group; and calculating the shortest distance between an obstacle vehicle included in the updated obstacle vehicle candidate group and the virtual radar sensor.

An embodiment of the disclosure makes it possible to accurately detect virtual obstacle vehicles using a virtual radar sensor, in an ADAS test environment that uses a virtual driving environment.

Additional aspects and advantages of the present disclosure will be set forth in part in the description which follows, and in part will be obvious from the description, or may be learned by practice of the disclosure.

DETAILED DESCRIPTION OF THE INVENTION

Figure 1:
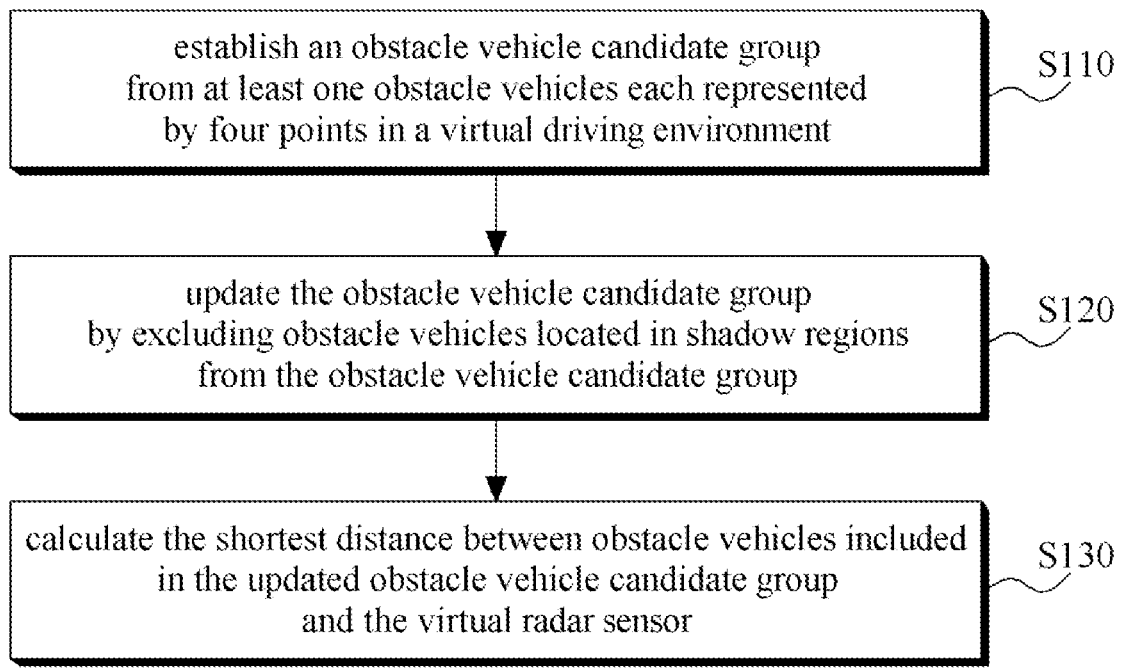
FIG. 1 is a flow diagram illustrating an obstacle detection method for a virtual radar sensor for an ADAS test of a vehicle according to an embodiment of the disclosure.

As the disclosure allows for various changes and numerous embodiments, particular embodiments will be illustrated in the drawings and described in detail in the written description. However, this is not intended to limit the present disclosure to particular modes of practice, and it is to be appreciated that all changes, equivalents, and substitutes that do not depart from the spirit and technical scope of the present disclosure are encompassed in the present disclosure. In describing the drawings, similar reference numerals are used for similar elements.

An ADAS is a system that provides the driver with various means of support based on sensing results obtained for the surroundings of a vehicle, and in the testing of an ADAS, sensing obstacles, etc., around the vehicle is of critical importance. However, in testing an ADAS in a virtual driving environment, it would not be possible to detect virtual obstacle vehicles with an actual radar sensor; therefore, it is necessary to detect virtual obstacle vehicles by using a virtual radar sensor.

Thus, an aspect of the disclosure proposes a method of detecting obstacle vehicles present in a virtual driving environment by using a virtual radar sensor for an ADAS test of a vehicle. An embodiment of the disclosure may consider the effect of shadow regions in relation to the obstacle vehicles included in the sensing range of the virtual radar sensor to choose the obstacle vehicles that are ultimately detected by the virtual radar sensor, and then, may calculate the shortest distances between the chosen obstacle vehicles and the virtual radar sensor.

In an actual radar sensor environment, a vehicle located in a shadow region would not be detected, because sensor waves would not reach the shadow regions, but since a virtual radar sensor does not use actual waves to detect obstacles, it is necessary to utilize an algorithm to detect the virtual obstacle vehicles in a manner similar to that of an actual radar sensor environment in which shadow regions are present.

An obstacle detection method for a virtual radar sensor for an ADAS test of a vehicle according to an embodiment of the disclosure can be performed on a computing device having a processor. The descriptions that follow refer to an example in which an obstacle detection method is performed by a vehicle testing device, a type of computing device.

Certain embodiments of the disclosure are described below in further detail with reference to the accompanying drawings.

FIG. 1 is a flow diagram illustrating an obstacle detection method for a virtual radar sensor for an ADAS test of a vehicle according to an embodiment of the disclosure.

A vehicle testing device according to an embodiment of the disclosure may establish an obstacle vehicle candidate group, consisting of obstacle vehicles that are wholly or partially included in the sensing range of the virtual radar sensor, from at least one obstacle vehicles each represented by four points in a virtual driving environment (S110).

The location of the virtual radar sensor can be configured differently according to the vehicle undergoing testing and can be configured, for example, to be in the center at the front of the vehicle. As vehicles generally have rectangular shapes, a vehicle can be represented by four points corresponding to the vertices of a rectangle. Depending on the embodiment, the coordinates of the points can be provided within the virtual driving environment or can be calculated by the vehicle testing device.

In order that the vehicle testing device may calculate the point coordinates, the vehicle testing device can receive input of the position information and orientation information for an obstacle vehicle present in the virtual driving environment and, using the inputted position information and orientation information, can calculate the four point coordinates for the obstacle vehicle. The position information can be, for example, GPS information for the obstacle vehicle.

In one embodiment, the vehicle testing device can calculate the four point coordinates (x1, y1) for each obstacle vehicle by using [Equation 1].

$$(x1, y1) = \begin{bmatrix} \cos\theta & -\sin\theta \\ \sin\theta & \cos\theta \end{bmatrix} \begin{bmatrix} \pm\frac{w}{2} \\ \pm\frac{l}{2} \end{bmatrix} + \begin{bmatrix} x \\ y \end{bmatrix}$$ [Equation 1]

Here, θ represents the orientation of the obstacle vehicle, and x and y represent the inputted position of the obstacle vehicle. Also, w represents the width of the obstacle vehicle, and l represents the length of the obstacle vehicle. The widths and lengths of the obstacle vehicles can be configured beforehand to be the same widths and same lengths, or different widths and lengths can be assigned for different obstacle vehicles.

The vehicle testing device may update the obstacle vehicle candidate group by excluding obstacle vehicles located in shadow regions from the obstacle vehicle candidate group (S120).

The sensing range of the virtual radar sensor can have a sector shape, and if two obstacle vehicles included in the sensing range are arranged in a line, for instance, then the part behind the obstacle vehicle in the front would become a shadow region, so that the obstacle vehicle in the back should not be detected. Thus, the vehicle testing device may update the obstacle vehicle candidate group such that the obstacle vehicles that are not included in shadow regions are included in the obstacle vehicle candidate group.

As described above, an obstacle vehicle can be wholly or partially included in the sensing range, and if the whole of an obstacle vehicle is included in the sensing range, then the vehicle testing device may determine the shadow region by using two of the points of the obstacle vehicle wholly included in the sensing range and may exclude obstacle vehicles located in the shadow region from the obstacle vehicle candidate group.

If a part of an obstacle vehicle is included in the sensing range, then the vehicle testing device may determine the shadow region by using the boundary line of the sensing range and one of the points of the obstacle vehicle partially included in the sensing range and may exclude obstacle vehicles located in the shadow region from the obstacle vehicle candidate group.

A vehicle testing device according to an embodiment of the disclosure may calculate the shortest distances between the obstacle vehicles included in the obstacle vehicle candidate group updated in operation S120 and the virtual radar sensor (S130).

Similarly to the determining of the shadow regions, the vehicle testing device may calculate the shortest distances with different methods depending on whether an obstacle vehicle is wholly included in the sensing range or partially included in the sensing range.

If the whole of an obstacle vehicle is included in the sensing range, then the vehicle testing device may generate a virtual line using the two points closest to the virtual radar sensor from among the four points of the target obstacle vehicle, which is included in the updated obstacle vehicle candidate group and is wholly included in the sensing range. Then, a line perpendicular to the virtual line may be drawn from the virtual radar sensor, and the shortest distance between the virtual radar sensor and the target obstacle vehicle may be calculated. The length of the perpendicular line may correspond to the shortest distance.

Depending on the arrangement of the target obstacle vehicle, it may occur that the intersection of the perpendicular line and the virtual line is not on the target obstacle vehicle, in which case the vehicle testing device can determine the shortest distance between the virtual radar sensor and the closest point as the shortest distance between the obstacle vehicle and the virtual radar sensor.

If only a part of an obstacle vehicle is included in the sensing range, then the vehicle testing device may generate a virtual line using one of the four points of the target obstacle vehicle, which is included in the updated obstacle vehicle candidate group and is partially included in the sensing range, as well as the orientation information of the target obstacle vehicle. Then, the shortest distance between the intersection of the virtual line and a boundary line of the sensing range and the virtual radar device may be calculated. The shortest distance between the intersection and the virtual radar device may correspond to the shortest distance between the virtual radar sensor and the target obstacle vehicle.

Depending on the arrangement of the target obstacle vehicle, it may occur that the shortest distance between the intersection and the virtual radar device does not correspond to the shortest distance between the virtual radar sensor and the target obstacle vehicle, in which case the vehicle testing device can determine the distance between the virtual radar sensor and the closest point as the shortest distance.

According to an embodiment of the disclosure, virtual obstacle vehicles can be detected accurately using a virtual radar sensor in an ADAS test environment using a virtual driving environment.

FIG. 2 to FIG. 5 are diagrams illustrating an example of implementing an obstacle detection method according to an embodiment of the disclosure.

In FIG. 2 to FIG. 5, the box shown in solid lines is the vehicle ('own') undergoing the ADAS test, and the boxes shown in dotted lines are obstacle vehicles ('target') in the virtual driving environment. Also, the sector shape represents the sensing range ('radar') of the virtual radar sensor. FIG. 2 to FIG. 5 illustrate an example in which the virtual radar sensor is located in the center at the front of the ADAS test vehicle.

Figure 2:
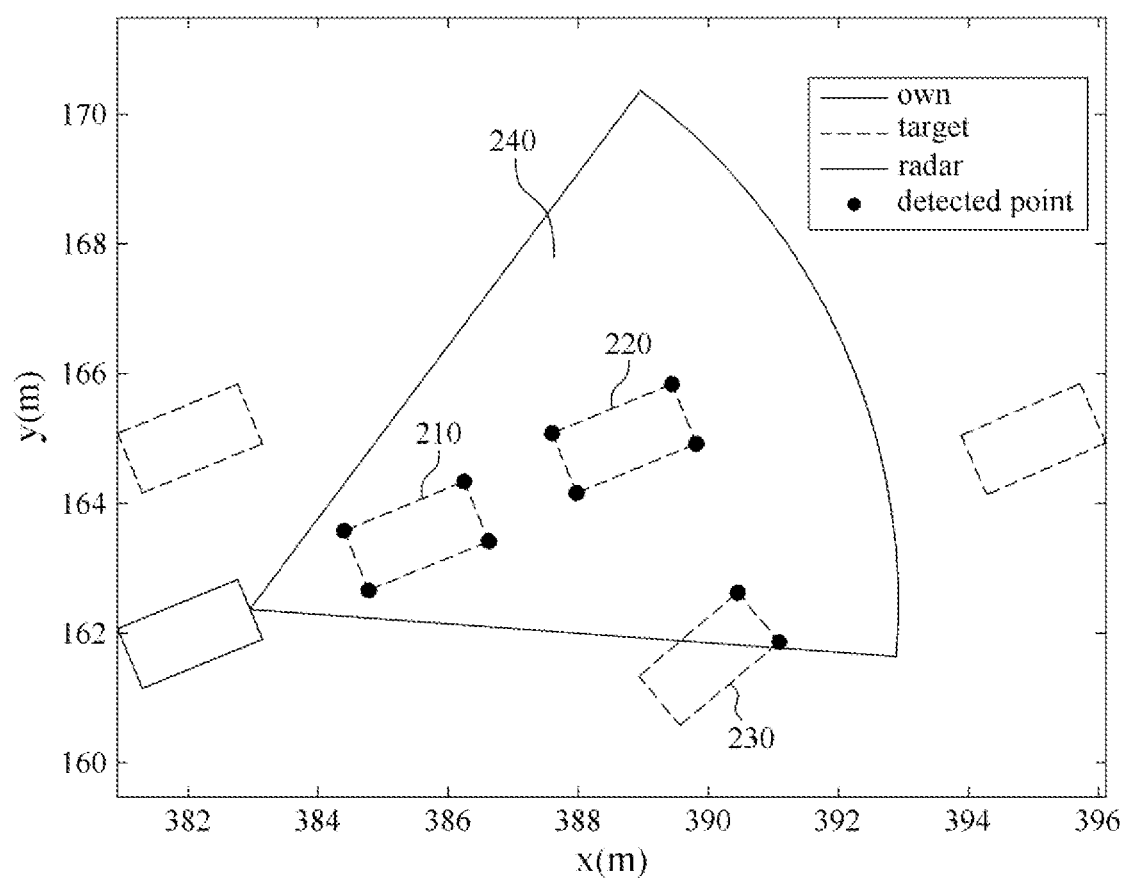
FIG. 2, FIG. 3, FIG. 4, and FIG. 5 are diagrams illustrating an example of implementing an obstacle detection method according to an embodiment of the disclosure.

As described above, an obstacle vehicle can be represented with four points, and FIG. 2 shows the detected points of obstacle vehicles 210, 220, 230 included in the sensing range 240 from among the respective four points of the obstacle vehicles.

The vehicle testing device according to an embodiment of the disclosure may determine shadow regions, and the shadow regions may be determined for the first and second obstacle vehicles 210, 220, which are wholly included in the sensing range. Also, the vehicle testing device may determine whether or not a shadow region formed by two of the points of an obstacle vehicle includes other obstacle vehicles. The two points can be set as the points that yield the largest size for the shadow region, and the determining of whether or not an obstacle vehicle is wholly or partially included in the sensing range may be based on whether or not all or some of the points representing the obstacle vehicle are included in the sensing region.

Figure 3:
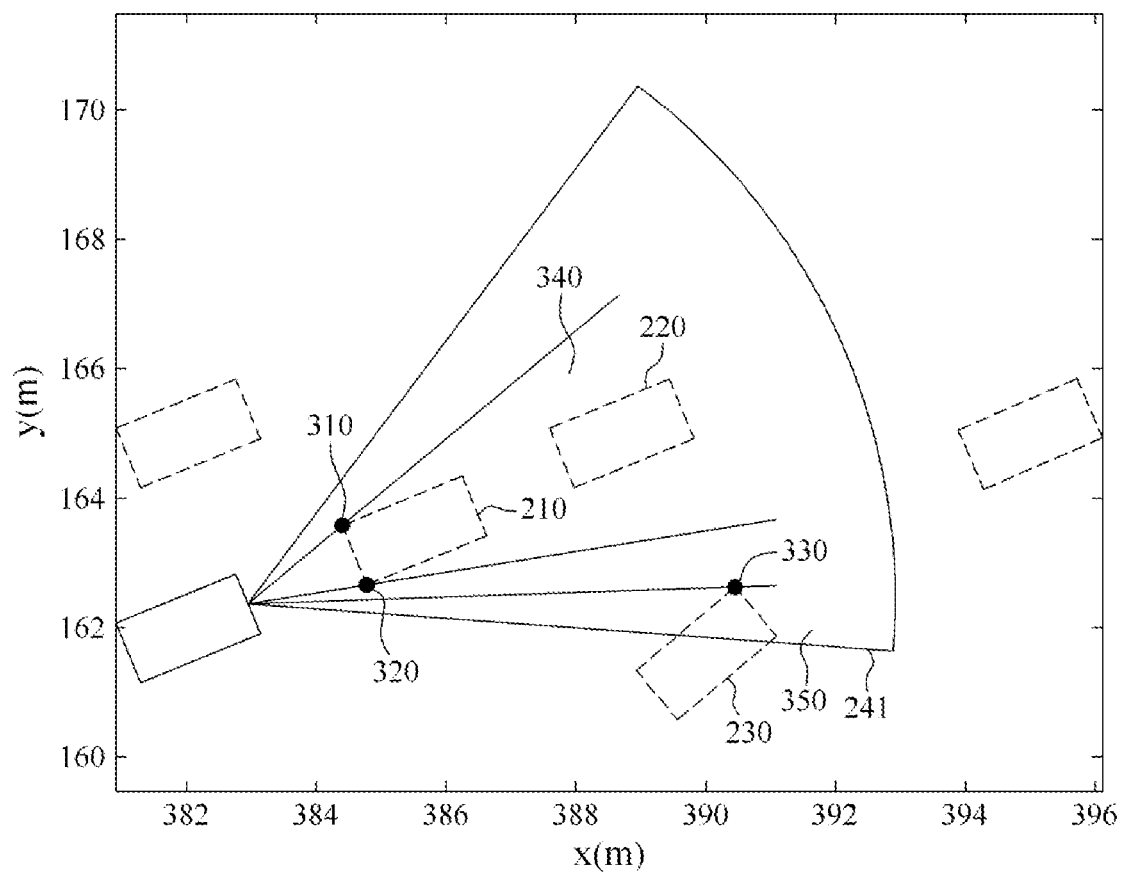

In FIG. 3, the shadow region 340 formed by a first obstacle vehicle 210 may correspond to the region formed when virtual lines are drawn from the virtual radar sensor to the first and second points 310, 320, respectively. As the second obstacle vehicle 220 is included in the shadow region 340 thus formed, the vehicle testing device may exclude the second obstacle vehicle 220 from the obstacle vehicle candidate group. While the vehicle testing device can determine a shadow range for the second obstacle vehicle as well, determining a shadow range for the obstacle vehicle may be unnecessary, since the obstacle vehicle is excluded from the detection targets.

The vehicle testing device may also determine a shadow range for a third obstacle vehicle 230, which is partially included in the sensing range. The vehicle testing device may select the points that yield the largest shadow region from among the points of the third obstacle vehicle 230 and may determine the shadow region 350 as the region formed by a virtual line extending from the virtual radar sensor to the selected third point 330 and the boundary line 241 of the sensing range.

Figure 4:
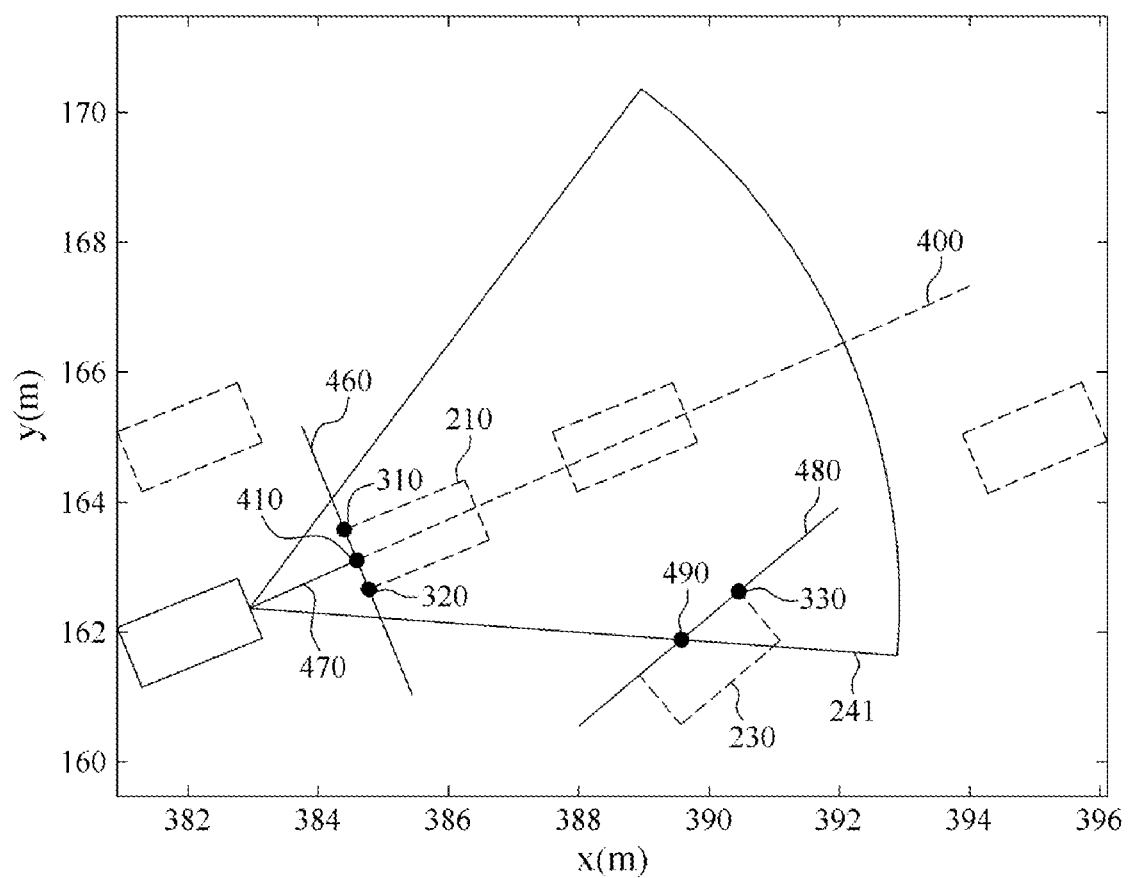

Referring to FIG. 4, in order to calculate the shortest distance, the vehicle testing device may select two points in the order of shortest distance from the virtual radar sensor from among the points of the first obstacle vehicle 210, which is wholly included in the sensing range, and may generate a virtual line 460 that passes through the selected first and second points 310, 320. These two points can correspond to the points that are recognizable by the virtual radar sensor.

Then, the vehicle testing device may draw a perpendicular line 470 to calculate the shortest distance between the virtual radar sensor and the virtual line 460, where the shortest distance would be the length of the perpendicular line 470 and may correspond to the shortest distance between the virtual radar sensor and the first obstacle vehicle 210.

Figure 5:
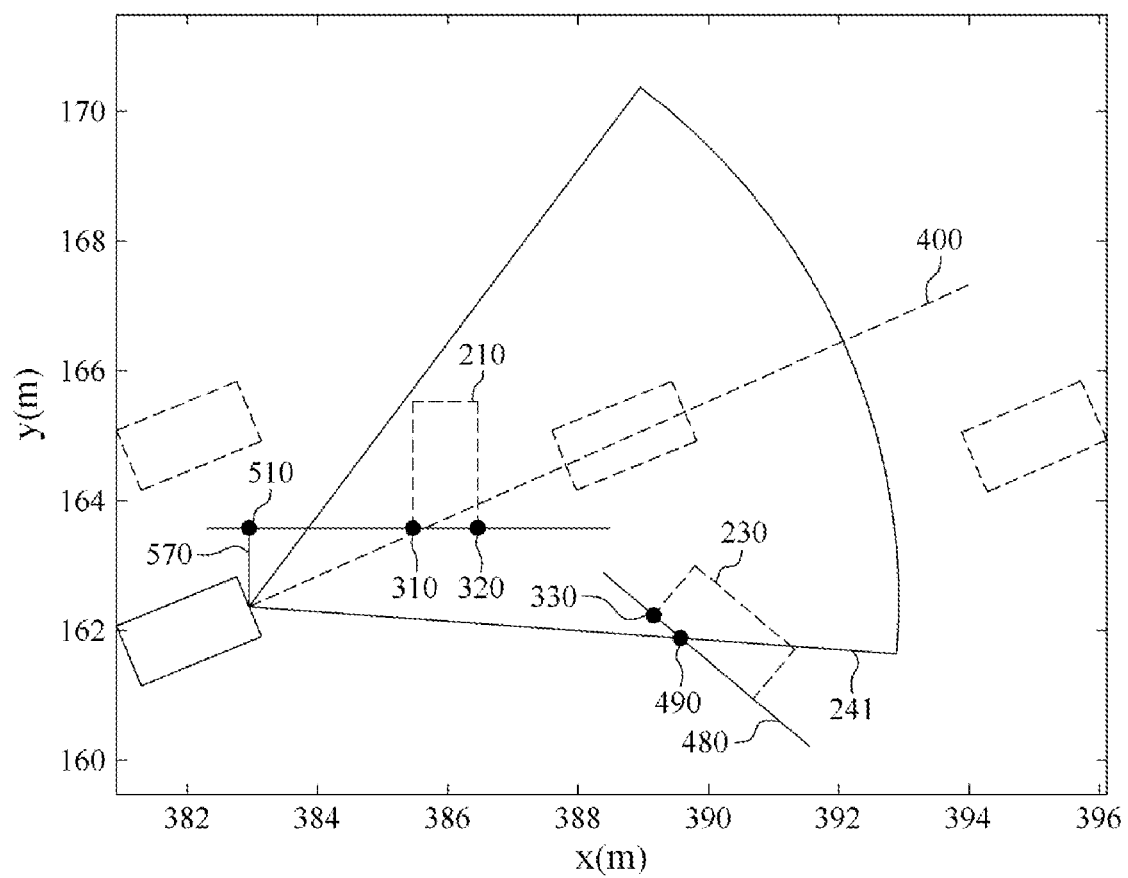

Whereas the intersection 410 of the perpendicular line 470 and the virtual line is located on the first obstacle vehicle 210 in FIG. 4, it may occur, depending on the arrangement of the vehicle, that the intersection 510 of the perpendicular line 570 and the virtual line is not on the obstacle vehicle 210, as in the case shown in FIG. 5. In such cases, the vehicle testing device can calculate the shortest distance between the virtual radar sensor and the point 310 closest to the virtual radar sensor from among the points of the obstacle vehicle 210, and this can be determined as the shortest distance between the virtual radar sensor and the first obstacle vehicle 210. In FIG. 5, the shortest distance between the first point 310 and the virtual radar sensor can correspond to the shortest distance between the virtual radar sensor and the first obstacle vehicle 210.

Returning again to FIG. 4, the vehicle testing device may generate a virtual line 480 by using one of the points of the third obstacle vehicle 230, which is partially included in the sensing range, and the orientation information for the third obstacle vehicle 230. The orientation information of the third obstacle vehicle 230 may correspond to the slope of the virtual line 480, and a third point 330 of the third obstacle vehicle 230 may be the one point included on the virtual line 480. The point selected for generating a virtual line can be the point closest to the virtual radar sensor and can be the closest point from among the points recognizable by the virtual radar sensor.

The vehicle testing device may calculate the shortest distance between the intersection 490 of the virtual line 480 and a boundary line 241 of the sensing range, where this shortest distance may correspond to the shortest distance between the virtual radar sensor and the third obstacle vehicle 230.

In FIG. 4, the angle formed by the center line 400 of the sensing range and the virtual line 480 is an acute angle, but in a situation such as that illustrated in FIG. 5, the angle formed by the center line 400 of the sensing range and the virtual line 480 is not an acute angle, and it can be seen that, in such situations, the shortest distance between the intersection 490 and the virtual radar sensor does not correspond to the shortest distance between the third obstacle vehicle 230 and the virtual radar sensor. In a situation such as that shown in FIG. 5, the shortest distance between the third point 330 and the virtual radar sensor may correspond to the shortest distance between the virtual radar sensor and the third obstacle vehicle 230.

Therefore, in cases where the angle between the virtual line and the center line of the sensing range is not an acute angle, the vehicle testing device may calculate the shortest distance between the intersection and the virtual radar sensor, and in cases where the angle is not an acute angle, the vehicle testing device may calculate the shortest distance between the virtual radar sensor and the closest point 330.

The technology described above can be implemented in the form of program instructions that may be performed using various computer means and can be recorded in a computer-readable medium. Such a computer-readable medium can include program instructions, data files, data structures, etc., alone or in combination. The program instructions recorded on the medium can be designed and configured specifically for the embodiments or can be a type of medium known to and used by the skilled person in the field of computer software. A computer-readable medium may include a hardware device that is specially configured to store and execute program instructions. Some examples may include magnetic media such as hard disks, floppy disks, and magnetic tapes, optical media such as CD-ROM's and DVD's, magneto-optical media such as floptical disks, and hardware devices such as ROM, RAM, flash memory, etc. Examples of the program of instructions may include not only machine language codes produced by a compiler but also high-level language codes that can be executed by a computer through the use of an interpreter, etc. The hardware mentioned above can be made to operate as one or more software modules that perform the actions of the embodiments, and vice versa.

While the present disclosure is described above by way of limited embodiments and drawings that refer to particular details such as specific elements, etc., these are provided only to aid the general understanding of the present disclosure. The present disclosure is not to be limited by the embodiments above, and the person having ordinary skill in the field of art to which the present disclosure pertains would be able to derive numerous modifications and variations from the descriptions and drawings above. Therefore, it should be appreciated that the spirit of the present disclosure is not limited to the embodiments described above. Rather, the concepts set forth in the appended scope of claims as well as their equivalents and variations are encompassed within the spirit of the present disclosure.

What is claimed is:

1. An obstacle detection method for an advanced driver assistance system (ADAS) test of a vehicle, the obstacle detection method comprising:
   detecting obstacle vehicles present in a virtual driving environment by using a virtual radar sensor of a vehicle undergoing the ADAS test;
   establishing an obstacle vehicle candidate group from at least one obstacle vehicles each represented by four points in the virtual driving environment, the obstacle vehicle candidate group consisting of obstacle vehicles being wholly or partially included in a sensing range generated by the virtual radar sensor of the ADAS test vehicle;
   updating the obstacle vehicle candidate group by excluding an obstacle vehicle located in a shadow region from the obstacle vehicle candidate group and by including an obstacle vehicle partially included in the sending range, the shadow region being generated by the virtual radar sensor using the obstacle vehicles being wholly or partially included in the sensing range;
   calculating a shortest distance between an obstacle vehicle included in the updated obstacle vehicle candidate group and the virtual radar sensor; and
   providing the shortest distance to the ADAS test vehicle for a real vehicle test evaluation of an ADAS.

2. The obstacle detection method of claim 1, further comprising:
   receiving input of position information and orientation information associated with an obstacle vehicle present in the virtual driving environment; and
   calculating coordinates of the four points associated with the obstacle vehicle by using the position information and orientation information.

3. The obstacle detection method of claim 2, wherein the updating of the obstacle vehicle candidate group comprises:
   determining a shadow region by using two points from among the points of an obstacle vehicle wholly included in the sensing range; and
   excluding an obstacle vehicle located in the shadow region from the obstacle vehicle candidate group.

4. The obstacle detection method of claim 2, wherein the updating of the obstacle vehicle candidate group comprises:
   determining a shadow region by using a boundary line of the sensing range and one point from among the points of an obstacle vehicle partially included in the sensing range; and
   excluding an obstacle vehicle located in the shadow region from the obstacle vehicle candidate group.

5. The obstacle detection method of claim 2, wherein the calculating of the shortest distance comprises:
   generating a virtual line by using two points closest to the virtual radar sensor from among the four points of a target obstacle vehicle, the target obstacle vehicle included in the updated obstacle vehicle candidate group and being wholly included in the sensing range; and
   calculating the shortest distance by drawing a perpendicular line to the virtual line from the virtual radar sensor.

6. The obstacle detection method of claim 5, wherein the calculating of the shortest distance comprises:
   calculating a shortest distance between the virtual radar sensor and a closest point, if an intersection of the perpendicular line and the virtual line is not on the target obstacle vehicle.

7. The obstacle detection method of claim 2, wherein the calculating of the shortest distance comprises:
   generating a virtual line by using one of the four points of a target obstacle vehicle and orientation information of the target obstacle vehicle, the target obstacle vehicle included in the updated obstacle vehicle candidate group and being partially included in the sensing range; and
   calculating a shortest distance between an intersection of the virtual line and a boundary line of the sensing range and the virtual radar sensor.

8. The obstacle detection method of claim 7, wherein the calculating of the shortest distance comprises:
   calculating a shortest distance between the intersection and the virtual radar sensor if an angle between the virtual line and a center line of the sensing range is an acute angle.

* * * * *